United States Patent [19]

Fulk, Jr.

[11] Patent Number: 4,861,487

[45] Date of Patent: Aug. 29, 1989

[54] SPIRAL WOUND MEMBRANE MODULES AND SYSTEMS WITH IMPROVED FEED SPACER DESIGN

[76] Inventor: Clyde W. Fulk, Jr., 48 Arlington St., Haverhill, Mass. 01830

[21] Appl. No.: 308,147

[22] Filed: Feb. 8, 1989

[51] Int. Cl.$^4$ .............................................. B01D 13/00
[52] U.S. Cl. .............................. 210/644; 210/321.74; 210/321.78; 210/321.83; 210/321.87
[58] Field of Search ...................... 210/321.74, 321.78, 210/321.79, 321.8, 321.83, 321.87, 321.88, 321.89, 634, 644, 649–651

[56] References Cited

U.S. PATENT DOCUMENTS 4,301,013 11/1981 Setti et al. .

Primary Examiner—Frank Sever
Attorney, Agent, or Firm—Richard P. Crowley

[57] ABSTRACT

A spirally wound membrane module and membrane system containing a plurality of modules in series which spirally wound membrane module includes a low pressure drop mesh spacer material composed of generally parallel elongated filaments positioned generally parallel to the flow direction of the feed stream and wherein the elongated filaments are connected by shorter bridge filaments which are placed at an angle to the flow of the feed stream to provide for a low pressure drop, spirally wound membrane module and which permits such module to be employed in series without exceeding a defined maximum, allowable pressure drop.

13 Claims, 1 Drawing Sheet

SPIRAL WOUND MEMBRANE MODULES AND SYSTEMS WITH IMPROVED FEED SPACER

BACKGROUND OF THE INVENTION

Spirally wound membrane modules and apparatus containing such modules have been employed in connection with the reverse osmosis and ultrafiltration separation of feed streams to a concentrate stream and permeate stream. For example, spirally wound membrane modules are often employed in ultrafiltration processes for separating food products, such as whey streams and gelatin streams or for the separation of fruit juices and concentration of aqueous electrodeposition paints, while spirally wound membrane modules are also employed for other purposes including reverse osmosis processes.

Spirally wound membrane modules typically comprise a central tube having passageways therein, a spirally wound membrane leaf composed of a pair of membrane sheets with a solid permeate collection sheet interposed therebetween and the membrane sheets sealed around the edges and wound around a central tube. The membrane leaf is spirally wound around the central tube with the membrane leaves separated by a mesh-type spacer material which forms a feed channel for the introduction of a feed stream in the channel created by the spacer and generally axially with the central tube and across the spacer material. The feed channel spacer mesh material typically comprises a type of plastic mesh material in which single filaments of plastic material are crisscrossed to form a diamond, net-like pattern.

In operation, the spirally wound membrane module is disposed in a housing and generally a feed solution to be separated is introduced into one end of the housing so that the feed solution flows generally axially across and in the feed spacer channel created by the spacer material, and a permeate stream is withdrawn through permeate collection holes in the central tube and from one end of the housing, while at the other end of the spirally wound membrane module in the housing, a concentrate stream is withdrawn. The feed stream flows across the feed spacer channel, and the permeate is collected within the membrane leaf material directed generally spirally and radially toward the permeate collection holes in the central tube while the concentrate material is removed from the other end of the housing of the spiral membrane module. Generally, in operation, the spiral membrane apparatus are employed in parallel or series.

A spiral membrane module with a controlled bypass seal is disclosed for example in U.S. Pat. No. 4,301,013, issued Nov. 17, 1981 and wherein the controlled bypass of the feed stream around and in the annular space about the exterior of the spirally wound membrane module and housing is provided by the use of a heat-shrinkable, open-type mesh material in the annular clearance space. The open mesh material permits control of the bypass about the annular clearance space to control the angle of the strands or fibers of the mesh material employed. The strands are placed at an angle to the axial flow, and such open mesh material is generally used also to form the mesh spacer material as feed channel spacer between the spirally wound membrane leaves.

SUMMARY OF THE INVENTION

The present invention relates to a spirally wound membrane module and to an apparatus containing the module and to a spirally wound membrane system containing a plurality of the membrane module apparatus in series. Such module apparatus and system contain an improved feed spacer design.

Spirally wound membrane modules typically employ a plastic netting material or spacing material to separate individual membrane leaves to provide a feed flow channel for flow through the spiral membrane module. Such plastic netting spacing materials are typically designed to facilitate mass transfer by promoting turbulence of the bulk feed flow through the feed channel spacer materials. The use of such prior art diamond, net-like plastic netting material reduces high pressure drops across the spirally wound membrane module due to this increased turbulence. By traditional reasoning, the advantages of reduced energy consumption with low pressure drop feed spacers are offset by a reduction in the mass transfer rate, and therefore, the present spirally wound membrane modules employ high turbulence-promoting net-like spacer materials which provide high pressure drops and high mass transfer rates.

The present invention concerns a low pressure drop spacer material and its use with spirally wound membrane modules, apparatus and systems. It has been found that a new, low pressure drop, mesh-type spacer material has significant advantages over those spacer materials presently employed in spirally wound membrane modules. The low pressure drop spacer material permits mass transfer rates to decline for the sake of lower hydrodynamic pressure drop through the feed channel of the spirally wound membrane module. However, the reduction in the mass transfer rate requires more membrane surface area than traditional designs and provides significant benefits in that because of the low pressure drop throughout the spirally wound membrane module, more spirally wound membrane module apparatus may be arranged in series without exceeding the maximum allowable feed inlet pressure. The invention permits the positioning of more spirally wound membrane apparatus in series and fewer in parallel, so that the circulation volume in crossflow membrane processes is reduced with the result that there are significant membrane system economic benefits due to the employment of smaller sized pumps, valves and piping in the system.

The invention comprises a spirally wound membrane module, which module contains a membrane to separate a feed stream into a permeate stream and a concentrate stream and which comprises a central tube having passage therein and at least one membrane leaf comprising a first and second membrane sheet materials and an intervening sheet of a permeate collection sheet material, the membrane leaf sealed about its peripheral edges along three sides thereof and spirally wound around the membrane tube, and spacer mesh-like material between the spirally wound membrane leaves to form a feed channel and wherein the improvement comprises the employment of a low pressure drop, mesh spacer sheet material comprising elongated filaments positioned generally parallel to the bulk flow direction of the introduction of the feed stream into the module to provide for a low pressure drop throughout the module and to maintain an open flow channel and shorter bridge filaments usually at generally regular intervals to the elongated filaments, which bridge filaments are positioned at an angle typically about 90 degrees to the bulk flow of the feed stream. Unlike the traditional prior art net-like spacer materials employed in spirally wound membrane modules in which a single filament crisscrosses to form a net-like pattern, and the bulk flow of the feed stream is directed at an angle, typically about 45° with respect to the filaments, the improved low pressure drop design spacer material with elongated filaments are directed generally parallel to the bulk flow feed stream direction so that their only function is maintain an open feed flow channel by separating adjacent layers of the membrane leaves. The traditional net or mesh-like spacer material as used in prior art spirally wound membrane modules is disclosed for example in FIG. 3 of U.S. Pat. No. 4,301,013 supra.

In one embodiment, the improved low pressure spacer material is comprised of elongated filaments as an integral continuous sheet of plastic material, typically polyethylene or polypropylene, wherein the elongated filaments are connected together by much smaller diameter filaments, typically 25% to 50% smaller, spaced preferably at regular intervals and which bridge filaments run to form a generally rectangular-type spacing, which shorter filaments are some obtuse angle generally perpendicularly across the feed stream bulk flow path. The function of the bridge-type filaments is simply to form a spacer with elongated filaments which runs parallel to the flow direction so that the spacer functions as a single, continuous sheet spacer material within the feed flow channel of the spirally wound membrane module. Generally, the low pressure drop spacer material may vary in design and form and is usually composed of open spaces, generally uniform, formed by overlapping single or double layers of strands of the material. The filaments for example may range from 10 mils to 100 mils in total thickness for example from about 15 mils to 40 mils in thickness. The filaments should be so designed so as to permit the low pressure drop to occur between the feed inlet and concentrate outlet of the spirally wound membrane module and are arranged generally parallel to the feed stream to the spacer channel, that is, it is longitudinal to the axis of the central tube. Generally, such spacer materials are formed of an integral or extruded polymeric materials, such as nylon, polyethylene, polypropylene, polycarbonate, hydrocarbons or other generally inert polymeric materials although the improved spacer material may be composed of any materials.

The spirally wound membrane modules employing the improved, low pressure spacer sheet material is designed to be inserted within a housing to form a spirally wound membrane apparatus and wherein the housing contains an inlet for the introduction of a feed stream so that the feed stream is introduced at the one end of the spirally wound membrane module and flows generally parallel to the axis of the central tube, and the housing contains an outlet at the other end of the housing to remove the concentrate stream from the housing, while a permeate stream passing through the membrane sheet material of the membrane leaf flows generally spirally and radially toward the central tube and from the passageways of the central tube and is removed from one or both outlets of the central tube in the housing.

The improved spirally wound membrane apparatus is particularly useful when employed in series, since the purpose of a low pressure drop spacer design permits the employment of a greater number of spirally wound membrane modules in series than in the prior art within the permissible, maximum allowable pressure for the feed stream. While the employment of a low pressure spacer material may require more membrane surface area due to the slight reduction in mass transfer rates, the employment of more modules in series and fewer in parallel reduces the circulation volume in crossflow membrane processes therefore providing significant economic benefits. The improved spirally wound membrane apparatus of the invention may be improved in a variety of systems for a variety of ultrafiltration and reverse osmosis processes and may be employed both in parallel and in series.

The invention will be described for the purposes of illustration only in connection with certain preferred embodiments; however, it is recognized that various changes, modifications, additions and improvements may be made to the illustrated embodiments by those persons skilled in the art, all falling within the spirit and scope of the invention.

DESCRIPTION OF THE EMBODIMENTS

Figure 1:
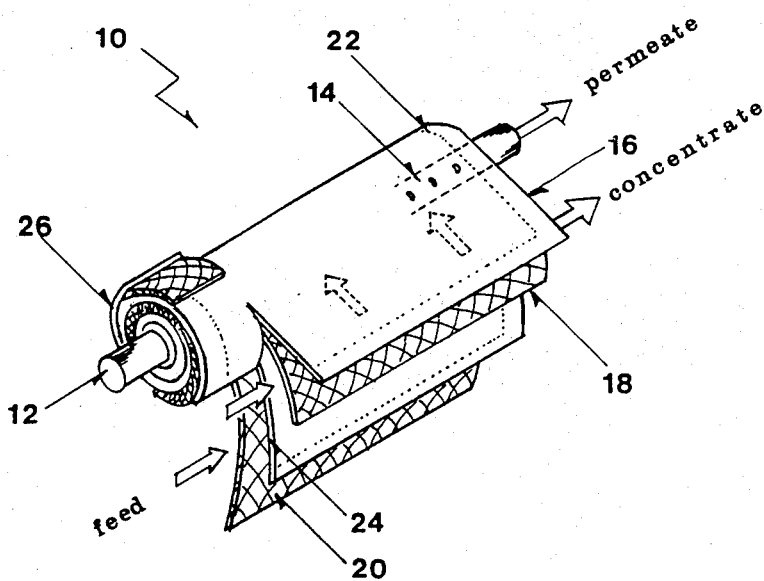
FIG. 1 is a perspective, partially fragmented view of a prior art spirally wound membrane module illustrating the prior art spacer material in the module.

FIG. 1 is an illustrated, perspective, partially fragmented view of a spirally wound prior art membrane module 10 which includes a center tube 12 having passageways 14 therein for the collection of permeate, the center tube having an outlet for the withdrawing of a permeate stream from the module. The module 10 comprises a spirally wound membrane leaf which is composed of two sheets of membranes, 16 and 24, with an intervening sheet of permeate spacer material 18 (for example, tricot), the membrane leaf comprising the membranes 16 and 24 with intervening spacer 18 therein with the leaves peripherally sealed by an adhesive zone 22 about the peripheral edges, and the membrane leaves 16 and 24 separated by a prior art net material which forms the feed path for the introduction of the feed stream axially at one end of the membrane module 10 with a concentrate removed from the other end of the membrane module. 10. The net material 20 is illustrated is a traditional mesh or net-type material in which single filaments crisscross to form a net-like diamond pattern wherein as illustrated the bulk flow of the feed stream is directed at an angle usually about 45° with respect to the filaments of the net material 20. Such prior art arrangement provides for high mass flow and turbulence, but also results in high pressure drops in the membrane module. The membrane module 10 is encased in a housing 26. The modules may be employed singly, in series or parallel for the separation of a feed stream into a permeate stream and a concentrate stream.

Figure 2:
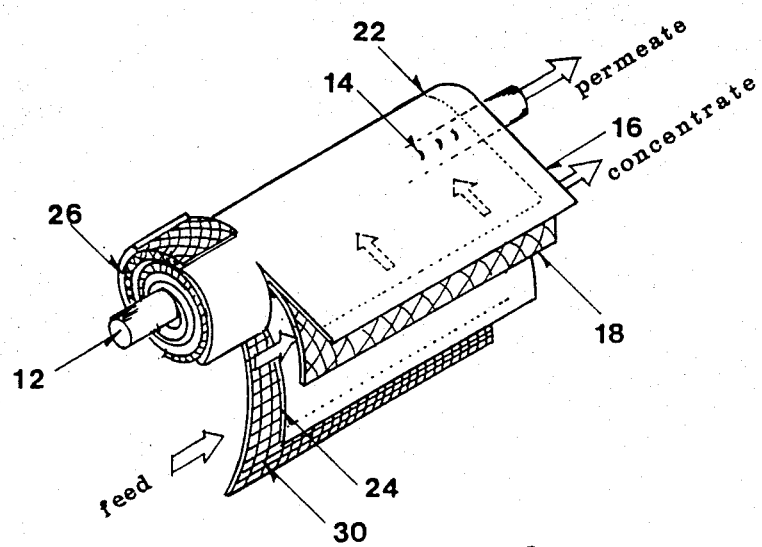
FIG. 2 is a perspective, partially fragmented view of a spirally wound membrane module showing the employment of the low pressure drop spacer material of the invention.
Figure 3:
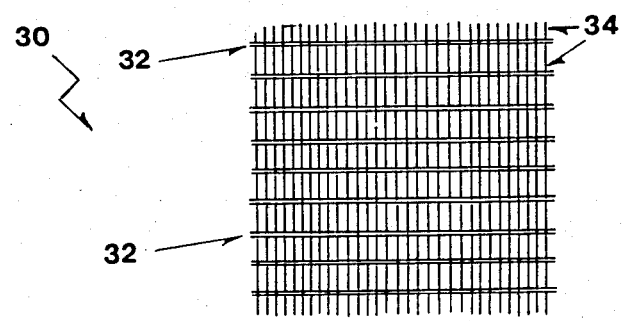
FIG. 3 is a plan view of the low pressure drop spacer material of the invention.

FIG. 2 is similar to FIG. 1, but instead of employing the usual crisscross, angle-type, diamond pattern filament net material as shown in FIG. 1 as the spacer material 20 between the membrane leaves 24, a low pressure, open spacer material 30 is employed. The low pressure spacer material shown 30 is illustrated more particularly in connection with FIG. 3 where the direction of the feed stream flow introduction is shown by the arrows to the left of the spacer material. The low pressure spacer material 30 has elongated filaments 32 with a diameter of about 10 mils to 100 mils and which are disposed directly generally parallel to the bulk flow direction of the introduction of the feed stream, that is, are axially longitudinally aligned with the center tube. The only function of such generally parallel line filaments is to maintain an open flow channel by separating adjacent layers of the membrane leaf. The elongated membrane filaments may be of any desired length and of any particular design.

As illustrated, the elongated parallel filaments 32 are connected together by smaller diameter, e.g. shorter bridge filaments 34 with a diameter of about 5 mils to 50 mils and generally spaced at regular intervals of about 1/16 inch to ½ inch to provide a generally uniform-type, rectangular spacer material. The function of the bridge filaments 34 is simply to provide a solid connecting bridge to the elongated filaments 32 so that the spacer material 30 functions as a single continuous sheet spacer material within the feed channel. Generally, it is desirable, but not essential, to have the bridge filaments of lesser diameter than the elongated filaments in order to promote low pressure drop, but the filaments may be of the same diameter or length, for example, 10 mils to 50 mils or may have a difference of between 10 mils and 50 mils.

In the practice of the invention, one type of suitable spacer material for use is Conwed product #T3350 as manufactured by Conwed Plastics of Minneapolis, Minn., composed of polypropylene with a resin melt temperature of about 325° F. Generally in a prior art spiral wound membrane module of 4" diameter with a feed of 30 gallons per minute, the pressure drop employing the prior art diamond net spacer material would be in the range of 10 psi to 30 psi, while with the use of the spacer material of the invention, such as the Conwed material T3350, the same module and flow would have a pressure drop of 50% or less, for example, 5 psi to 15 psi.

What is claimed is:

1. In a spirally wound membrane module to separate a feed stream into a permeate stream and a concentrate stream, which module comprises:
   (a) a housing for the module;
   (b) a central tube having passageways therein and disposed in the housing;
   (c) a membrane leaf which comprises a first and second membrane sheet materials with a permeate collection sheet material interposed between the membrane sheet materials and the membrane sheet materials sealed about their peripheral edges to form a spirally wound membrane leaf about the central tube;
   (d) a open mesh spacer material spiral wound and disposed between the adjacent membrane sheet materials of the membrane leaf to form a spiral wound flow channel for the feed stream, the improvement which comprises:
      (i) means for minimizing the pressure drop of the feed stream through said module including a low pressure drop, open mesh-type spacer sheet material to form said flow channel comprising elongated filaments positioned generally parallel to the flow of the feed stream in the flow channel, the elongated filaments connected by bridge filaments, which bridge filaments are positioned at an angle to the flow of the feed stream;
   (e) an inlet at one end of the housing for the introduction of a feed stream to be separated;
   (f) an outlet at the other end of the housing for the withdrawal of a concentrate stream from the housing; and
   (g) a permeate outlet in the central tube to permit the withdrawal of a permeate stream from the central tube whereby the feed stream flows axially from one to the other end in the flow channel and the permeate stream flows radially inwardly toward the central tube within the membrane leaf.

2. The module of claim 1 wherein the pressure drop of the module is about 50 percent or less than the same module and flow with a prior art diamond net spacer material.

3. The module of claim 1 wherein the elongated filaments of the spacer material are about over twice as long as the bridge filaments in the spacer material.

4. The module of claim 1 wherein the diameter of the elongated filaments in the spacer material is greater than the diameter of the bridge filaments.

5. The module of claim 1 wherein the bridge filaments are shorter in length than the elongated filaments and generally uniformly positioned.

6. The module of claim 1 wherein the bridge filaments are generally disposed perpendicular to the flow of the feed stream.

7. The module of claim 1 wherein the elongated filament spacer material is characterized by generally rectangular, uniform, open spaces with the diameter of the elongated filaments and bridge filaments ranging from about 10 mils to 100 mils.

8. A spirally wound membrane system which comprises a plurality of the spirally wound membrane apparatus of claim 1 wherein the spirally wound membrane apparatus are serially connected so that the concentrate stream or permeate stream of the first and sequential modules becomes the feed stream of the following module.

9. In a spirally wound membrane module to separate a feed stream into a permeate stream and a concentrate stream, which module comprises:
   (a) a housing for the module;
   (b) a central tube having passageways therein and disposed in the housing;
   (c) a membrane leaf which comprises a first and second membrane sheet materials with a permeate collection sheet material interposed between the membrane sheet materials and the membrane sheet materials sealed about their peripheral edges to form a spirally wound membrane leaf about the central tube;
   (d) a open mesh spacer material spiral wound and disposed between the adjacent membrane sheet materials of the membrane leaf to form a spiral wound flow channel for the feed stream, the improvement which comprises:
      means for minimizing the pressure drop of the feed stream through said module including a low pressure drop, open mesh-type spacer sheet material to form said flow channel comprising a plurality of generally parallel, elongated filaments positioned generally parallel to the flow of the feed stream in the said flow channel from the one to the other end, and the elongated filaments connected by a plurality of shorter and less diameter, regularly spaced bridge filaments to form a generally uniform rectangular, open mesh spacer material, the bridge filaments generally disposed perpendicular to the flow of the feed stream, thereby providing a membrane module having a low pressure drop.

(e) an inlet at one end of the housing for the introduction of a feed stream to be separated;

(f) an outlet at the other end of the housing for the withdrawal of a concentrate stream from the housing; and (g) a permeate outlet in the central tube to permit the withdrawal of a permeate stream from the central tube whereby the feed stream flows axially from one to the other end in the flow channel and the permeate stream flows radially inwardly toward the central tube within the membrane leaf.

10. A spirally wound membrane system which comprises a plurality of the spirally wound membrane apparatus of claim 9 wherein the spirally wound membrane apparatus are serially connected so that the concentrate stream or permeate stream of the first and sequential modules becomes the feed stream of the following module.

11. In a method of separating a feed stream into a concentrate stream and a permeate stream in a spirally wound ultrafiltration membrane module comprising a spirally wound membrane leaf separated by a mesh-like spacer material to form a flow channel, which method comprises:

(a) flowing feed stream generally axially from the one to other end in the flow channel of the spirally wound membrane module;

(b) withdrawing a concentrate stream from the other end of the flow channel;

(c) withdrawing a permeate stream which flows radially toward the center of the module within the membrane leaf from the module, the improvement which comprises providing minimal pressure drop through said module by:

(i) disposing as the spacer material to form the said flow channel an open, mesh-like spacer material comprising elongated filaments connected with bridge filaments, the elongated filaments having a length greater than the bridge filaments and disposed generally parallel to the flow of the feed stream in the said flow channel; and (ii) flowing the feed stream generally parallel to the elongated filaments from the one to other end to provide a low pressure drop in the membrane module.

12. The method of claim 11 which includes:

(a) disposing a plurality of membrane modules in series;

(b) introducing the concentrate or permeate stream of the first module and sequential modules as the feed stream of the next following module thereby permitting the employment of a greater number of modules in series before exceeding the permissible pressure drop.

13. The method of claim 11 wherein the feed stream comprises an aqueous, electrodeposition paint stream.

* * * * *